(12) United States Patent
Hartman et al.

(10) Patent No.: US 6,494,466 B1
(45) Date of Patent: Dec. 17, 2002

(54) VALVE SEAL CONSTRUCTION WITH NON-CONGRUENT SIDE SERRATIONS

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 0 days.

(21) Appl. No.: 09/552,801

(22) Filed: Apr. 20, 2000

(51) Int. Cl.⁷ .................................. F16J 15/44
(52) U.S. Cl. ................ 277/641; 277/637; 277/638; 251/305; 251/306
(58) Field of Search ................ 251/305, 306; 277/630, 637, 638, 641, 643

(56) References Cited

U.S. PATENT DOCUMENTS

| | | |
|---|---|---|
| 2,762,601 A | 9/1956 | Clade |
| 3,356,336 A | 12/1967 | Maenaka |
| 3,462,120 A | 8/1969 | Priese |
| 3,544,066 A * | 12/1970 | Fawkes ............... 251/306 |
| 3,563,510 A | 2/1971 | Priese |
| 3,591,133 A | 7/1971 | Miles et al. |
| 3,726,503 A | 4/1973 | Fawkes |
| 3,799,501 A * | 3/1974 | Hartman ............... 251/306 |
| 3,910,555 A | 10/1975 | Bertrem et al. |
| 3,958,314 A | 5/1976 | Kurkjian, Jr. |
| 4,006,882 A | 2/1977 | Bonafous |
| 4,063,709 A | 12/1977 | Lorthiois |
| 4,083,529 A | 4/1978 | Santy et al. |
| 4,266,754 A | 5/1981 | Ninomiya et al. |
| 4,304,392 A * | 12/1981 | Maciulaitis ............... 251/306 |
| 4,826,133 A | 5/1989 | Hiltebrand |
| 5,692,758 A | 12/1997 | Wikström |

\* cited by examiner

Primary Examiner—Anthony Knight
Assistant Examiner—Enoch E Peavey
(74) Attorney, Agent, or Firm—Thompson Coburn LLP

(57) ABSTRACT

A seal used for a valve housing for a rotatable valve is received in an internal annular groove in the valve housing. The seal has the form of a resilient ring with an annular interior surface, an annular exterior surface, and axially opposite first and second circular end surfaces that extend radially between the annular interior surface and the annular exterior surface. The first and second circular end surfaces of the ring have annular lobes that project axially from the first and second end surfaces. The ends of the lobes are rounded. The annular groove of the valve housing has a center axis, a bottom wall and a pair of opposed side walls extending around the center axis. Slots are formed in the side walls of the groove. The lobes of the ring extend into the slots of the groove. The lobes of the seal and the slots of the groove are non-congruent and form voids between the seal and the groove. Adhesive is distributed inside the internal annular groove between the groove bottom wall and the ring exterior surface and in at least some of the voids between the lobes and slots.

18 Claims, 2 Drawing Sheets

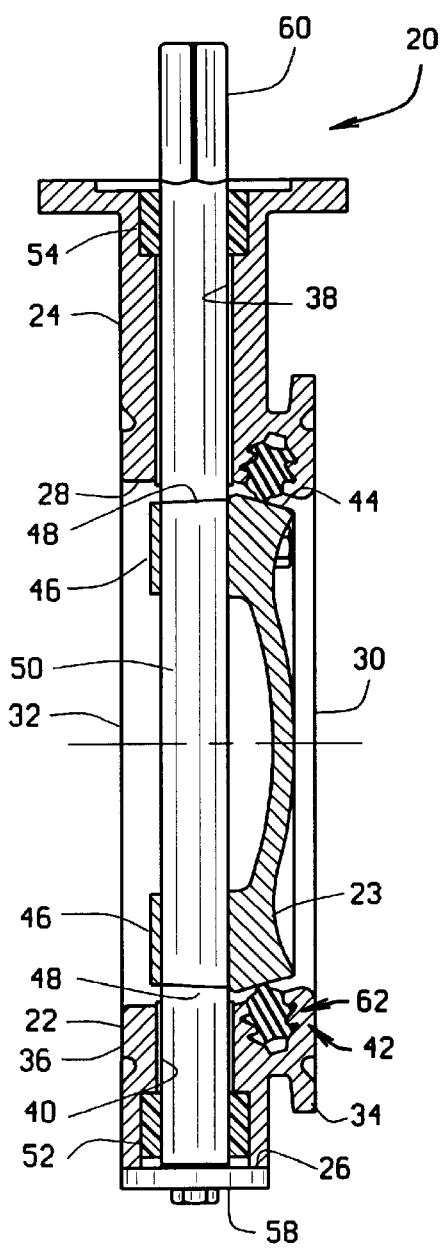
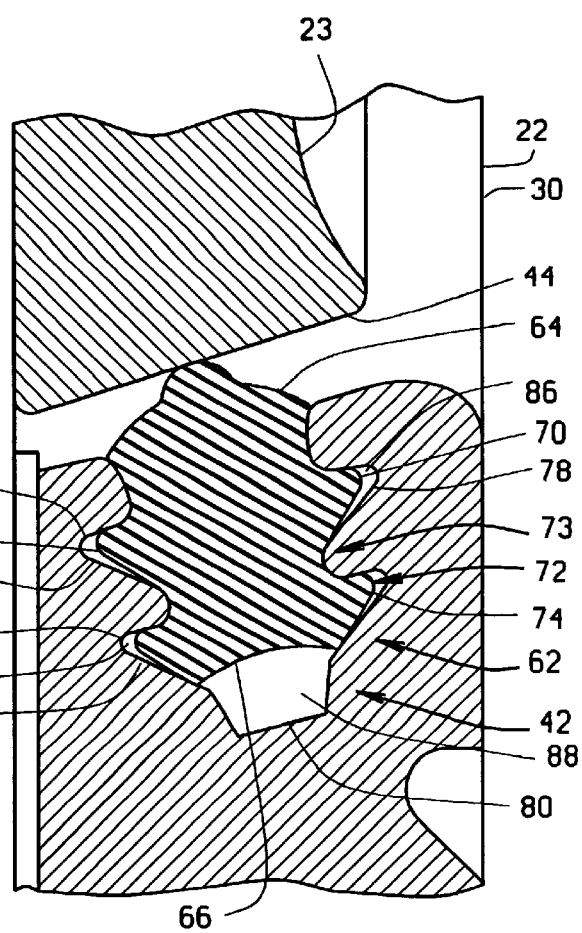

VALVE SEAL CONSTRUCTION WITH NON-CONGRUENT SIDE SERRATIONS

BACKGROUND OF THE INVENTION

1) Field of the Invention

The present invention relates to a type of seal used in a rotatable valve. A valve member, pivotally disposed in a valve housing, makes contact with the seal to form a leak-tight boundary in the valve housing to secure a flow of fluid through the valve. Specifically, the invention relates to an improvement in the seals used in these valves.

2) Description of the Related Art

Valves having resilient seals are widely used in commerce and have a multitude of applications. Such valves are commonly used in fluid piping systems to stop and start the flow of fluid through the piping system. The specific construction of these valves differs widely depending upon the application in which the valves are used. Generally, the valves of the type to which the present invention pertains include a valve housing with an inlet and outlet port, a hollow interior defining a volume through which fluid flows between the inlet and outlet ports, and a rotatable valve member mounted within the interior of the valve housing. The valve member is pivotably disposed within the hollow interior of the valve housing about an axis which is generally perpendicular to the flow of fluid through the valve. Generally, the valve member is mounted on a shaft that extends through the hollow interior of the valve housing. The shaft is turned by a mechanical drive system for opening and closing the valve. When the valve member is rotated to a position that defines a plane which is generally parallel with the direction of fluid flow, the valve is fully open. When the valve member is rotated to a position that defines a plane which is generally perpendicular to the direction of fluid flow, the valve is closed.

To provide a leak tight boundary within the valve housing, the valve is provided with a seal. In conventional construction of these valves, the seal has many forms. Generally, the seal is an annular member positioned in the interior of the valve body that is adapted to contact the valve member as the valve member rotates to the closed position. Often the seal is affixed to the interior of the valve housing by means of an interior annular groove in the valve housing. The groove helps retain the seal in a position where it will contact the perimeter of the valve member when the valve member is in the closed position to form a leak tight boundary between the valve and the valve housing under a wide range of pressures and fluid flow conditions. Conventional valve construction also involves the use of mechanical means such as adhesives, frictional engagement, welding, and riveting to help retain the seal in position in the annular groove of the valve housing interior.

In some prior art valve structures, such as the one disclosed in U.S. Pat. No. 3,544,066, a curable polymeric material, such as epoxy resin is used to retain the valve seal within the internal annular groove of the valve body. In the '066 patent, the seal is constructed from a Buna-N type of rubber material with 60–75 durometer hardness. The valve seal is inserted into the internal annular groove and the epoxy resin is introduced, in liquid form, between the annular exterior surface of the seal and the internal annular groove. The integrity of the seal formed in this manner is dependent upon the epoxy's bonding strength and the amount of epoxy coverage between the seal and groove surfaces. Thus, as disclosed in the '066 patent and in later designs of seals for use in conventional valves, the surface area of the seal and groove surfaces exposed to the epoxy is increased to raise the relative strength of the bond between the seal and the groove. In the '066 patent, the seal is formed with a grooved inner surface to increase the seal inner surface exposed to the epoxy, and thereby improve the gripping co-action between the seal and the epoxy resin to bond the seal to the groove.

To assist in retaining the seal within the interior annular groove of the valve housing, conventional valve designs use a seal with a formed profile that interlocks with the formed groove profile in the housing of the valve. In U.S. Pat. No. 3,799,501 such a structure is disclosed. In the '501 patent, the seal is formed with annular fins on its side faces that cooperate with the chevron cross section of the annular groove formed in the interior surface of the valve housing. To provide the maximum amount of frictional engagement between the seal and the groove, the profiles are closely matched. When the valve member is moved to the closed position, the elastomer ring compresses under the force of the valve member and interlocks tightly with the annular groove.

However, the use of both of these techniques to secure the seal in the valve housing has been a continuing challenge to designers of these valves. Epoxy resin alone has been found to be insufficient to retain a seal in the groove under extreme flow conditions. For example, under a throttle flow condition, wherein an extreme pressure differential exists between the upstream and downstream sides of the valve (e.g., when a valve is only slightly open and fluid is forced through a highly restricted area), differential pressures acting on the valve seal may cause the relatively large volume of epoxy under the seal to deform, thus moving the seal in the annular groove. Without a structure surrounding the seal to retain the seal in position in the valve housing (an interlock), the seal may fail to seat against the valve member when the valve member is returned to the closed position. In this situation, the integrity of the leak tight boundary of the valve is breached.

On the other hand, when the profiles of the seal and the valve housing or groove are closely matched so as to provide a maximum amount of surrounding and gripping co-action between the two surfaces, the injected epoxy cannot be consistently and evenly dispersed between the two surfaces to effectively bond the surfaces together. As a result, the integrity of the seal may also be compromised, since a portion of the seal may be held in the groove only by the frictional cooperation of the inter-engaging profiles.

The use of a closely matched and tight fitting interlock between the seal and the interior annular groove has other draw backs. The cost of constructing a valve using a system of inter-engaging profiles increases with the complexity of the form of the interlock. Generally, the valve housing is cast with the annular groove having the formed profile for the interlock. In order to increase the frictional engagement and strength of the interlock, the formed profile used in the annular groove must be fabricated with a relatively high level of dimensional accuracy so that it closely matches the complementing formed profile on the seal. This high level of dimensional accuracy requires more stringent manufacturing controls for both the seal and the valve housing/groove, thus increasing the cost of the valve.

When a more closely matched formed profile and tighter fitting interlock is used between the seal and the groove to increase the frictional engagement, the seal becomes more difficult to install in the groove. Using conventional installation methods, the seal is mechanically forced into the groove. Although the seal is generally flexible and compressible, when the interlock between the seal and the groove is tightly controlled during manufacture, the amount of force needed to insert the seal in the groove dramatically increases because of the near interference fit between the seal and the groove. Consequently, during installation of the seal in the groove, the large amount of force exerted on the annular interior surface of the seal may result in damage to the seal as it is inserted into the groove. Since the interlock portion of the seal generally has the smallest cross section, the interlock surfaces of the seal may not be able to withstand the amount of force needed to install the seal in the groove. Hence, the damage may be sustained on the seal portion of the interlock, where the resultant damage decreases the ability of the interlock to frictionally hold the seal in the internal annular groove.

Thus, there is a need for a valve seal that effectively incorporates the advantages of both an interlock system and a epoxy resin to withstand high stress flow conditions without loosing the ability to maintain an effective seal. Further, under certain extremely high stress conditions, such as the throttle flow condition, there is a need for a valve seal that will resist failure. Still further, there is a need for a valve seal that does not require complex or cumbersome installation. Still further, there is a need for a valve seal that does not significantly increase the manufacturing costs associated with the valve.

SUMMARY OF THE INVENTION

Among the several advantages of the present invention over the prior art may be noted the provision of a valve seal that is capable of withstanding high stress flow conditions without loosing its ability to maintain an effective seal; the provision of a valve seal that is constructed to resist failure even in high stress flow conditions, such as a throttle flow condition; and the provision of a valve seal that does not require a complex or cumbersome installation; and a valve seal that does not significantly increase costs associated with manufacturing the valve.

In one aspect of the invention, a seal is installed in an internal annular groove in a valve housing for a rotatable valve. This seal is a resilient ring dimensioned to fit inside the internal annular groove when the ring is inserted into the internal annular groove. The ring has an annular interior surface, an annular exterior surface, and axially opposite first and second circular end surfaces that extend radially between the annular interior surface and the annular exterior surface. The ring has a cross-sectional area that leaves at least one void between the internal annular groove and the first and second circular end surfaces of the ring when the ring is inserted into the annular groove. These voids allow the epoxy injected into the internal annular groove to flow through the voids between the seal and the groove, thus holding the seal in the groove.

In yet another aspect of the invention, the seal includes the resilient ring affixed in the internal annular groove of the valve housing for the rotatable valve. The groove has a center axis, and a bottom wall and a pair of side walls extending around the center axis. The ring has an annular interior surface, an annular exterior surface that opposes the bottom wall of the internal annular groove, and axially opposite first and second circular end surfaces that oppose the side walls of the internal annular groove. The ring has a cross-sectional area that leaves voids between the side walls of the internal annular groove and the first and second end surfaces of the ring. In this arrangement epoxy can be deposited in the internal annular groove between the bottom wall of the groove and the annular exterior surface of the ring, and in at least some of the voids between the side walls of the groove and the first and second end surfaces of the ring.

To increase the strength of the bond between the seal and the groove, the surface area of the groove and the side walls is increased. Slots are formed in the side walls of the internal annular groove and lobes are formed in the seal that project from the first and second circular end surfaces of the ring. To provide an interlock, the lobes of the ring project into the slots formed in the side walls of the groove. The lobes have rounded ends that are received in the slots formed in the side walls of the groove and the lobes define voids between the rounded ends of the lobes and the slots. The slots also have rounded roots to allow the epoxy to firmly bond the seal in the groove wall and permit epoxy to more evenly disperse around the seal in the groove.

BRIEF DESCRIPTION OF THE SEVERAL VIEWS OF THE DRAWINGS

Further objects and features of the invention are revealed in the following detailed description of the preferred embodiment of the invention and in the drawing figures wherein:

FIG. 3 is a cross-sectional view of the valve taken along the plane of line 3-3 of FIG. 2; and FIG. 4 is an enlarged, partial view of the seal and groove of the present invention.

Corresponding reference characters indicate corresponding parts throughout the several views of the drawings.

DETAIL DESCRIPTION OF THE INVENTION

Figure 1:
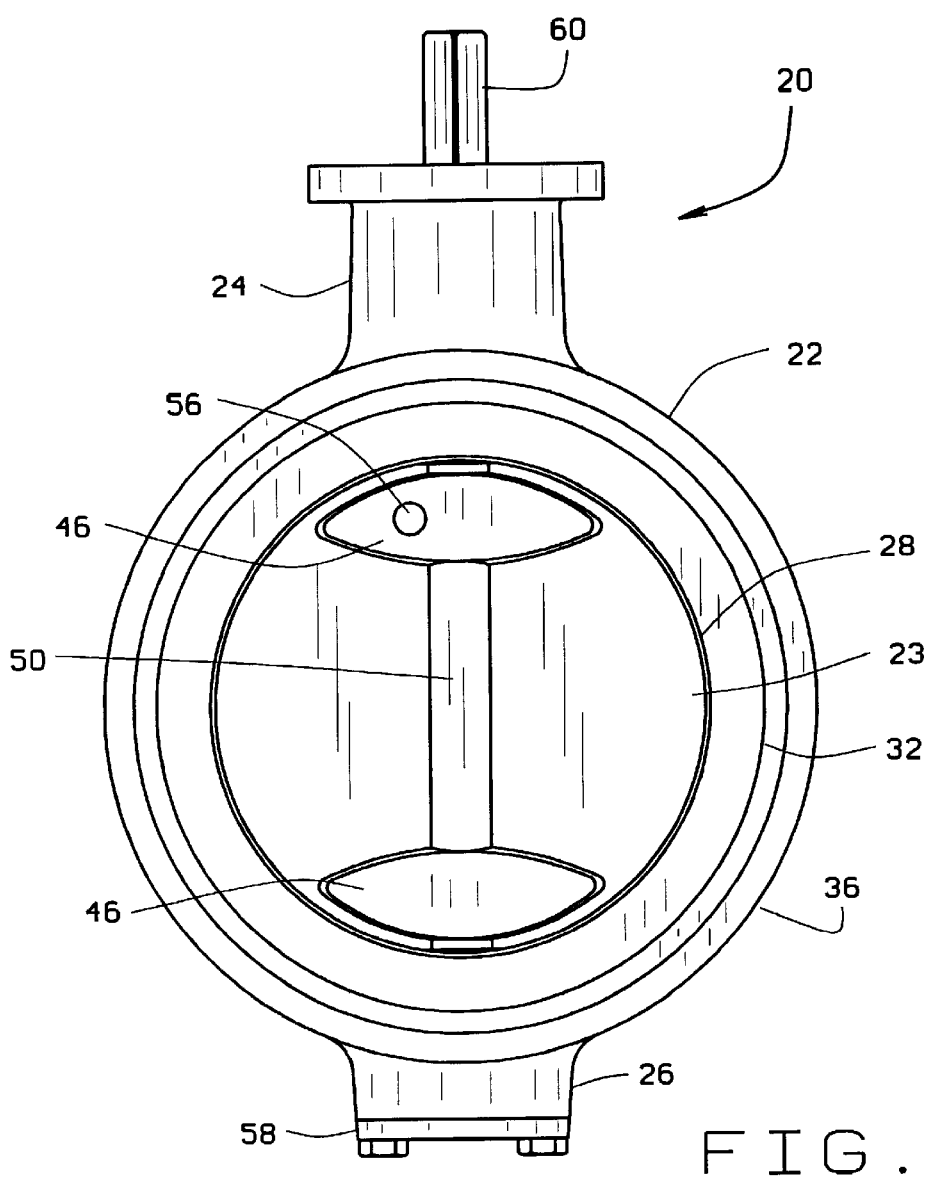
FIG. 1 is a front elevation view of a valve typical of the class of valves to which the invention pertains.
Figure 2:
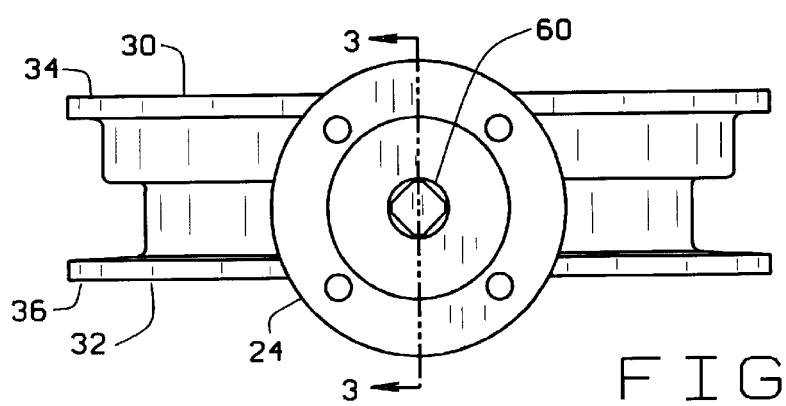
FIG. 2 is a top view of the valve of FIG. 1.

FIGS. 1, 2, and 3 show a valve assembly typical of the type of valve assembly into which the seal of the present invention is installed. The valve assembly shown in the drawing figures, generally indicated as reference numeral 20, includes a valve housing 22 and a valve member 23 mounted in the valve housing 22 for pivoting movement between opened and closed positions. FIG. 1 shows a conventional butterfly valve; however, the invention may be practiced with numerous other styles of valves including ball, plug, and other valves having a movable valve member.

FIGS. 1 and 2 show a general configuration of the valve member 23 and valve housing 22. The valve housing 22 is generally cylindrical except for an upper shaft hub 24 and a lower shaft hub 26 that project from radially opposite ends of the exterior surface of the valve housing 22. A generally cylindrical hollow interior surface 28 passes through the valve housing 22 from an inlet port 30 to an outlet port 32 of the housing 22. As viewed in FIG. 3, the inlet port 30 is at the right side of the housing 22 and the outlet port 32 is at the left side of the housing 22, although the direction of the flow of liquid through the valve housing 22 is not critical to the operation of the present invention, and could be reversed. The housing 22 exterior surface is provided with a circular upstream flange 34 and a circular downstream flange 36. The flanges 34,36 are employed in connecting the valve housing 22 between adjacent upstream and downstream lengths of pipe (not shown). As is conventional, the housing 22 can be connected between the two lengths of pipe by threaded fasteners inserted through aligned holes of the flanges 34,36 of the valve housing and mating flanges of the upstream and downstream lengths of pipe. Alternatively, and depending on the size of the particular valve assembly with which the invention is used, connections between the valve housing 22 and adjacent lengths of pipe can be accomplished with complementary threaded connectors and other known means of connecting pipe to valve housings.

As shown in FIG. 3, an upper section of a shaft hole 38 passes through the upper shaft hub 24 and a lower section of a shaft hole 40 passes through the lower shaft hub 26. Positioned just upstream from the shaft holes 38,40 is an internal annular groove, generally indicated as reference numeral 42. The internal annular groove 42 is formed in the interior surface 28 of the valve housing and extends completely around the interior surface.

The valve member 23 has a circular configuration with a generally cylindrical or frustoconical sealing surface 44 extending around its periphery. A pair of ridges 46 extend across an downstream face of the valve. Aligned shaft holes 48 extend through the ridges 46. A shaft 50 passes through the upper section shaft hole 38 in the upper shaft hub 24, through the pair of shaft holes 48 in the valve element ridges 46, and into the lower section shaft hole 40 in the lower shaft hub 26 of the valve housing 22. The lower end of the shaft 50 is received for rotation in a pivot bushing and seal assembly 52 represented at the bottom of the lower section shaft hole 40. The opposite end of the shaft is received in a pivot bushing and seal assembly 54 represented at the top of the upper section shaft hole 38. Referring to FIG. 1, a key pin 56 passes through a hole in the upper disk valve ridge 46 and into a notch (not shown) in the shaft, securing the valve member 23 and the shaft 50 together. A circular flange 58 is secured to the lower shaft hub 26 over the lower bushing and sealing assembly. A stub 60 portion at the opposite end of the shaft 50 projects from the upper shaft hub 24 of the valve housing 22. An actuator of any known type, either manually operated or mechanically operated, is connected to the stub shaft 60 and is operated to rotate the shaft and the attached valve member 23 between their opened and closed positions.

The closed position of the valve member 23 relative to the valve housing 22 is shown in FIGS. 1, 3 and 4. In this position, the valve member 23 is positioned generally perpendicular to the center axis of flow through the hollow interior 28 of the valve housing 22. Thus, the inlet port 30 and outlet port 32 are partitioned by the valve member 23, forming the leak tight boundary between the valve housing 22 and the valve member 23, and isolating the inlet port 30 from the outlet port 32. To completely open the valve member 23, the shaft 50 and attached valve member 23 are rotated 90° to position the valve member 23 generally parallel to the axis of fluid flow through the valve housing 22.

In order to provide the most leak tight condition for the valve member 23 in the closed position, a seal, generally indicated by reference numeral 62, is provided. The seal 62 is positioned to compress under pressure of the valve member 23 when the valve member 23 is rotated to its closed position. The seal 62 is retained in position by the annular groove 42.

Details of the construction of the seal 62 and the groove 42 of the invention are best seen in FIG. 4. The seal 62 has the general shape of a ring with an annular interior surface 64, an annular exterior surface 66, and opposite first and second circular end surfaces 68,70 extending between the annular interior and exterior surfaces 64,66. The annular exterior surface 66 of the seal has a general concave cross-section, and the annular interior surface 64 of the seal has a general convex shape in cross section. The convex shape of the seal interior surface 64 preferably extends beyond the hollow interior surface 28 of the valve 20 when the seal is inserted into the valve housing groove 42 so as to abut the sealing surface 44 of valve member 23 and compress slightly when the valve member 23 is in the closed position. Preferably, the circular end surfaces 68,70 of the seal are formed with a plurality of lobes 72 that extend away from the first and second circular end surfaces 68,70, giving the end surfaces 68,70 of the ring a generally serrated appearance in cross section.

As shown in FIG. 4, the plurality of lobes 72 increase the surface area of the end surfaces 68,70 of the seal for enhanced bonding, and the plurality of lobes 72 form the seal's portion of an interlock, generally indicated as reference numeral 73. As shown in FIG. 4, each successive lobe has a rounded end 74 and is swept back toward the annular interior surface 64 of the seal. Preferably, the number of lobes on the first and second end surfaces 68,70 is the same. In the preferred embodiment of the seal 62, each of the lobes 72 on the first circular end surface 68 has a corresponding lobe on the second end surface 70, and each of the corresponding lobes has the same relative position with respect to the annular interior surface 64 of the seal. Thus, the corresponding lobes are arranged in concentric, circular rows across the seal from the annular exterior surface 66 to the annular interior surface 64 of the seal. In an alternative construction (not shown), the lobes on the first and second circular end surfaces may have a staggered configuration from the first circular end surface to the second circular end surface. In the preferred embodiment of the seal 62 shown in FIG. 4, starting from the annular interior surface 64 and moving radially across the seal 62 toward the annular exterior surface 66, the distance across each successive row of lobes decreases. Thus, the seal 62 has an overall trapezoidal cross section that tapers toward the annular exterior surface 66.

As shown in FIG. 4, the valve housing 22 is formed with the internal annular groove 42 adjacent the inlet port 30 of the valve housing 22. The groove 42 is formed with opposing first and second side walls 76,78 spaced apart by a bottom wall 80. The groove 42 is formed to receive the seal 62 as described previously and has a cross section with the same general shape as the seal 62. The surfaces of the groove side walls 76,78 are formed with a plurality of annular slots 82 where the number of slots on the first and second groove side walls 76,78 is the same as the number of lobes 72 formed on the end surfaces of the seal 62. Preferably, each slot is formed with a rounded root 84. In order to interlock with the preferred embodiment of the seal 62, the plurality of slots 82 is arranged in a similar manner to the plurality of lobes 72. Following the preferred embodiment of the seal 62, each of the slots in the first wall 76 of the groove has a corresponding slot in the second wall 78 of the groove, and each of the slots has the same relative position with respect to the hollow interior surface 28 of the valve housing 22. Preferably, each slot has a similar geometry to the lobe of the seal 62 in that the slot is swept back toward the hollow interior 28 of the valve housing 22 and the plurality of slots 82 generally taper radially toward the bottom wall 80 of the groove 42. Starting from the hollow interior 23 of the valve housing and moving radially across the groove 42 toward the bottom wall 80 of the groove, the distance across each successive row of slots decreases, giving the groove 42 an overall trapezoidal cross section that tapers toward the bottom wall of the groove and matches the general shape of the seal 62.

Together, the arrangement of rows of lobes on the seal 62 and rows of slots in the groove 42 provides the frictional interlock 73 to hold the seal 62 within the groove 42. Preferably, the spacing between each row of lobes and slots matches. However, an alternative construction of the seal and groove (not shown) uses a staggered arrangement of slots and lobes on the first and second sides of the groove and seal. The general trapezoidal shape that tapers radially towards the bottom wall 80 of the groove allows the seal 62 to be more easily inserted into the groove 42. Since the distance across the row of lobes decreases radially from the annular interior surface 64 to the annular exterior surface 66 of the seal, and the distance from the first groove wall 76 to the second groove wall 78 decreases radially from the hollow interior 28 of the valve housing 22 to the bottom wall 80 of the groove 42, the seal 62 does not encounter a substantial amount of interference and resistance from the sides 76,78 of the groove wall as it is inserted in the annular groove 42. Moreover, since the lobes 72 and slots 82 are swept back toward the hollow interior surface 28 of the valve housing 22, the geometry acts in a manner similar to a system of barbs that firmly hold the seal 62 in the groove 42 and prevent movement of the seal 62 out of the groove 42 under extreme flow conditions.

Although, the form of the lobes 72 on the seal 62 and the form of the slots 82 in the groove 42 share a general tapered and swept back cross section, the geometry of the cross section of the slots 82 and the lobes 72 is non-congruent. Preferably, the angle at which each of the profiles of the lobes 72 and slots 82 is swept back is different. The rounded root 84 of the slot is preferably formed with a radius smaller than the radius on the rounded end 74 of the lobe on the seal 62. The seal 62, once installed in the groove, may have a slight slip fit in the groove 42 in the circumferential direction because of the clearances created between the groove 42 and the seal 62 by the non-congruent geometric cross sections. Since the surfaces of the circular end surfaces 68,70 of the seal and the side walls 76,78 of the groove are not congruent, when the lobes 72 are fitted into the slots 82, voids 86 are produced between the surfaces. Since each slot and lobe have a non-congruent geometry, a plurality of voids 86 is formed between the circular end surfaces 68,70 of the seal and the side walls 76,78 of the groove. The presence of the voids 86 is due to the axial spacing between the root surfaces of the opposed slots being larger than the axial spacing between the rounded ends of the seal lobes on opposite end surfaces of the seal. This difference in the axial spacing makes it easier to insert the seal in the groove and increases the surface of the adhesive bond between the seal and groove as will be explained.

As shown in FIG. 4, the annular exterior surface 66 of the seal 62 is spaced away from the bottom wall 80 of the groove 42. This spacing forms an annular channel 88 around the seal 62 into which the epoxy resin may be injected and evenly dispersed around the seal 62 to bond the seal to the groove 42. The pressure from the injection of epoxy allows the epoxy to flow in the channel 88 and in between the seal 62 and the groove 42. The plurality of voids 86 between the seal 62 and the groove receive the epoxy, and the rounded root 84 of the slot and rounded end 74 of the lobe provides an enhanced condition for the epoxy to adhere and form a continuous and even bond between the seal 62 and the groove 42. Experimentally, it has been found that the rounded ends 74 of the lobes and the rounded root surfaces 84 of the slots promote better adhesion between the seal 62 and the groove 42 over that of seals and grooves having surfaces with sharp corners. Preferably, the radius of the root 84 is relatively large to ensure the epoxy does not create a vacuous bridge and weak bond between the seal and the groove. On the other hand, the radius of the root 84 is dimensioned to form the void 86 between the slot 82 and the lobe 72, and to allow the lobe 72 to fit in the slot 82 without interference.

In constructing the valve 20 to which the seal of the present invention is used, the seal 62 is first inserted into the groove 42 with mechanical force. However, because of the tapered geometry of both the seal 62 and the groove 42, the seal 62 may be inserted with less relative force than in conventional designs. Since the seal 62 is compressible, each row of lobes can be deformed to engage its respective row of slots without substantial resistance and interference from another row of lobes to be subsequently engaged in its respective other slots. After the seal is installed, the valve member 23 is rotated to the closed position and epoxy is injected in the channel 88 to bond the seal 62 to the groove 42. During the injection of the epoxy, the concave-shape of the annular exterior surface 66 of the seal allows the injection pressure to urge the seal 62 in the groove 42 radially towards the hollow interior 28 of the valve housing 22 and against the valve member 23. Thus, the seal 62 is urged to conform to any irregularities in the seating surface 44 of the valve member 23 to improve the leak tight boundary between the inlet and the outlet ports 30,32 of the valve 20. The concave shape also increases the surface area of the annular exterior surface 66 of the seal to enhance the bond between the groove 42 and the seal 62. The movement of the seal 62 towards the hollow interior 28 of the valve housing 22 provides communication between the voids 86 and the channel 88 for epoxy flow into the voids 86. The epoxy entering the voids 86 increases the surface area of both the seal 62 and the groove 42 that is adhered by the epoxy and produces a stronger bond. Once the epoxy is cured, the seal 62 becomes firmly bonded to the groove in a position that allows the seal to conform to the sealing surfaces 44 of the valve member 23. The convoluted shape of the end surfaces 68,70 of the seal 62 and the side walls 76,78 of the groove 42 provide an improved interlock 73 and an improved method to distribute the epoxy over conventional valve designs.

Preferably, epoxy is distributed to each of the voids 86 formed between the seal 62 and the groove 42. However, where epoxy fails to fill a void 86, the non-congruent geometry of the void 86 provides another advantageous sealing characteristic. When the void 86 does not receive epoxy, the non-congruent geometry of the slot 82 and lobe 72 allows the void to communicate with the hollow interior 28 of the valve housing 22. In this situation, high pressure fluid may be directed from the hollow interior 28 of the valve housing 22 into the void 86. The high pressure fluids acts on the seal 62 and urges the seal 62 in a direction to engage the sealing surface 44 of the valve member 23, thus creating a more leak tight boundary for the valve 20.

While the present invention has been described by reference to specific embodiments, it should be understood that modifications and variations of the invention may be constructed without departing from the scope of the invention defined by the following claims.

What is claimed is:

1. A seal for a valve housing containing a rotatable valve and having an annular interior surface with an internal annular groove in the interior surface that extends outwardly into a monolithic portion of the valve housing, the annular groove being adapted to receive the seal by pushing the seal outwardly into the groove, the seal comprising:

a resilient ring dimensioned to fit inside the internal annular groove when the ring is inserted into the internal annular groove, the resilient ring has an annular interior surface, an annular exterior surface, and axially opposite first and second circular end surfaces that extend radially between the annular interior surface and the annular exterior surface, the ring has a cross-sectional area that interlocks with the groove, and the ring cross-sectional area leaves at least one void between the internal annular groove and the first and second circular end surfaces of the ring when the ring is inserted into the internal annular groove.

2. The seal of claim 1, wherein:
the ring interior surface has a circumferential dimension that causes the interior surface to be spaced radially inwardly from the internal annular groove when the ring is inserted into the groove.

3. The seal of claim 2, wherein:
the ring exterior surface has a circumferential dimension that causes the external surface to be spaced from the bottom surface of the internal annular groove when the ring is inserted into the groove.

4. The seal of claim 1, wherein:
the first and second end surfaces of the rings have annular lobes that project axially from the first and second end surfaces to rounded ends of the lobes.

5. The seal of claim 4, wherein:
the rounded ends of the lobes leave voids between the first and second end surfaces of the ring and the internal annular groove when the ring is inserted into the groove.

6. The seal of claim 1, wherein:
the ring is constructed of a resilient, compressible material.

7. The seal of claim 1 for use in the valve housing having the internal annular groove, the internal groove having said bottom wall and first and second opposing side walls with a groove volume therebetween, the seal further comprising:
the ring having an outer portion that is received in the groove volume and an inner portion that projects outside the groove volume when the ring is inserted into the internal annular groove, and the ring outer portion has a cross-sectional area that is smaller than a cross-sectional area of the internal annular groove occupied by the ring outer portion.

8. A seal comprising:
a valve housing containing a rotatable valve and having an internal annular groove, the groove has a center axis and a bottom wall and a pair of opposed side walls extending around the center axis;
a resilient ring is fit inside the internal annular groove, the resilient ring has an annular interior surface, an annular exterior surface that opposes the bottom wall of the internal annular groove, axially opposite first and second circular end surfaces that extend radially between the annular interior surface and the annular exterior surface and oppose the side walls of the internal annular groove, the ring has a cross-sectional area that interlocks with the groove, the cross-sectional area leaves voids between the side walls of the internal annular groove and the first and second end surfaces of the ring; and
slots are formed in the side walls of the groove and lobes project from the first and second end surfaces of the ring into the slots.

9. The seal of claim 8, wherein:
an adhesive is contained inside the internal annular groove between the groove bottom wall and the ring exterior surface and in at least some of the voids between the side walls of the groove and the first and second end surfaces of the ring.

10. The seal of claim 8, wherein:
the lobes have rounded ends that are received in the slots and define the voids between the lobe rounded ends and the slots.

11. The seal of claim 8, wherein:
the ring interior surface has a circumferential dimension that causes the interior surface to be spaced radially inwardly from the internal annular groove.

12. The seal of claim 8, wherein:
the ring is constructed of a resilient, compressible material.

13. A seal comprising:
a valve housing containing a rotatable valve and having an internal annular groove, the groove has a center axis, a bottom wall and a pair of opposed side walls extending around the center axis and slots are formed in the side walls of the groove; and,
a resilient ring is fit inside the internal annular groove, the resilient ring has an annular interior surface, an annular exterior surface that opposes the bottom wall of the internal annular groove, axially opposite first and second circular end surfaces that extend radially between the annular interior surface and the annular exterior surface and annular lobes that project axially from the first and second end surfaces into the slots of the groove;
the lobes have rounded ends that are received in the slots;
the slots have rounded ends that receive the lobes; and
the rounded ends of the lobes and the rounded ends of the slots define voids between the lobes and slots.

14. The seal of claim 13 wherein:
an adhesive is contained inside the internal annular groove between the groove bottom wall and the ring exterior surface and in at least some of the voids between the lobes and slots.

15. A seal comprising:
a valve housing containing a rotatable valve and having an interior surface with an internal annular groove in the interior surface that extends outwardly into a monolithic portion of the valve housing, the groove has a center axis and a bottom wall and a pair of opposed side walls extending around the center axis;
a resilient ring fit inside the internal annular groove, the resilient ring has an annular interior surface, an annular exterior surface that opposes the bottom wall of the internal annular groove, and axially opposite first and second circular end surfaces that extend radially between the annular interior surface and the annular exterior surface and oppose the side walls of the internal annular groove, where the first and second end surfaces and their respective opposed side walls of the groove are not congruent; and
circular slots are formed into the side walls of the groove and annular lobes project from the first and second end surfaces of the ring into the slots.

16. The seal of claim 15, wherein:
the circular slots and the annular lobes define voids between the slots and lobes.

17. A method of facilitating insertion of a seal in a valve housing containing a rotatable valve, the method comprising:

providing an internal annular groove in an interior surface of the valve housing with the groove extending outwardly into a monolithic portion of the valve housing with the groove having a center axis, a bottom wall and a pair of opposed side walls that extend around the center axis;

providing a resilient ring for insertion into the internal annular groove with the ring having an annular interior surface, an annular exterior surface and axially opposite first and second circular end surfaces that extend radially between the annular interior surface and the annular exterior surface, the ring has a cross-sectional area that interlocks with the groove, the cross-sectional area leaves voids between the side walls of the internal annular groove and the first and second end surfaces of the ring when the ring, is inserted into the internal annular groove;

inserting the ring into the internal annular groove by pushing the ring outwardly into the groove with the ring exterior surface opposing the groove bottom wall and the ring first and second end surfaces opposing the groove side walls leaving voids between the groove side walls and the first and second end surfaces of the ring; and providing lobes with rounded ends on the first and second end surfaces of the ring and providing circular slots in the side walls of the internal groove and inserting the lobes into the slots when inserting the ring into the internal annular groove with the lobes and slots defining the voids between the groove side walls and the first and second end surfaces of the ring.

18. The method of claim 17, further comprising:

inserting an adhesive in at least some of the voids between the groove side walls and the first and second end surfaces of the ring.

* * * * *

UNITED STATES PATENT AND TRADEMARK OFFICE
CERTIFICATE OF CORRECTION

PATENT NO. : 6,494,466 B1
DATED : December 17, 2002
INVENTOR(S) : Hartman et al.

It is certified that error appears in the above-identified patent and that said Letters Patent is hereby corrected as shown below:

Column 8,
Line 65, after "valve housing," insert -- the annular groove having slots formed on its interior surface that decrease in opening distance from a groove opening to a groove bottom wall, --.

Column 9,
Line 1, after "resilient ring," insert -- corresponding to --.
Line 7, cancel "the ring" to and including "with the groove,"
Line 8, insert the following -- the ring has lobes formed on both of the first and second circular end surfaces to mesh with the annular groove slots such that a ring cross-sectional area interlocks with the groove when the ring is inserted into the annular groove, --.
Line 21, cancel "bottom surface of the internal annular groove," and insert -- groove bottom wall --.
Line 36, delete "having said".
Line 50, after "center axis" insert -- , the groove decreases in opening distance from a groove opening to the groove bottom wall --.
Line 59, before "interlocks," insert -- corresponds to and --.
Line 64, before "project," insert -- are formed on the first and second end surfaces that --.
Line 65, cancel "ring into the slots," and insert -- ring and have a configuration that complements the slots on the groove sidewalls whereby the lobes are received in the slots with the ring assembled in the groove --.

Column 10,
Line 22, after "the center axis" insert -- , the groove decreases in opening distance from a groove opening to the groove bottom wall --.
Lines 22 and 30, after "and," insert -- a plurality of --.
Line 31, cancel "into the slots of" to and including "groove,"
Line 32, insert -- with each lobe positioned on the ring to correspond and engage with one of the plurality of slots of the groove side wall with the ring inserted into the groove --.
Line 48, after "the center axis" insert -- , the groove decreases in opening distance from a groove opening to the groove bottom wall --.
Line 63, after "annular lobes" insert -- are formed o the ring in positions where the lobes correspond to the slots and --.

UNITED STATES PATENT AND TRADEMARK OFFICE
CERTIFICATE OF CORRECTION

PATENT NO.   : 6,494,466 B1
DATED        : December 17, 2002
INVENTOR(S)  : Hartman et al.

It is certified that error appears in the above-identified patent and that said Letters Patent is hereby corrected as shown below:

Column 11,
Line 12, cancel "the ring has a" to and including "interlocks with the groove,"
Line 13, insert -- the ring has lobes formed on both of the first and second circular end surfaces to mesh with the annular groove slots such that a ring cross-sectional area interlocks with the groove when the ring is inserted into the groove, --.

Signed and Sealed this

Twenty-second Day of April, 2003

JAMES E. ROGAN
*Director of the United States Patent and Trademark Office*